United States Patent

[11] 3,620,780

[72] Inventors James Economy
Eggertsville;
Raymond V. Anderson, Ransomville, both of N.Y.
[21] Appl. No. 776,562
[22] Filed Nov. 18, 1968
[45] Patented Nov. 16, 1971
[73] Assignee The Carborundum Company
Niagara Falls, N.Y.
Continuation-in-part of application Ser. No. 471,208, July 12, 1965, now Patent No. 3,429,722. This application Nov. 18, 1968, Ser. No. 776,562

[54] BORON NITRIDE FIBER MANUFACTURE
4 Claims, 2 Drawing Figs.
[52] U.S. Cl. .................................................. 106/55, 106/69
[51] Int. Cl. ....................................................... C04b35/58, C04b 35/14
[50] Field of Search .......................................... 106/39, 55, 69; 23/191

[56] References Cited
FOREIGN PATENTS
954,285 4/1964 Great Britain ................ 106/55

*Primary Examiner*—James E. Poer
*Attorney*—K. W. Brownell

ABSTRACT: Fibers incorporating a boron and nitrogen containing composition are produced by reacting, with a nitrogen and hydrogen containing composition, fibers having a maximum diameter of about 20-30 microns and incorporating substantially throughout their thickness a boron and oxygen containing composition. Preferably, boric oxide fibers having a maximum diameter of about 10 microns are heated in an ammonia atmosphere according to a suitable temperature program to produce fibers consisting essentially of a boron nitride composition. Fibers may also be produced consisting of boron nitride and other constituents such as silica. Fibers produced according to the invention are useful for a wide variety of purposes including thermal and electrical insulation, fabrication of textiles and reinforcement of plastics, ceramics and metals.

Fig. 1.

VARIATION OF TENSILE STRENGTH WITH FIBER DIAMETER

Fig. 2.

INVENTORS
James Economy
Raymond V. Anderson

BORON NITRIDE FIBER MANUFACTURE

This is a continuation-in-part of application Ser. No. 471,208, filed July 12, 1965 and now U.S. Pat. No. 3,429,722.

This invention relates to boron nitride fiber manufacture, and more particularly to a new and improved resulting inorganic fiber incorporating a boron and nitrogen containing composition converted in situ from a precursor fiber having a maximum diameter of about 20–30 microns and incorporating substantially throughout its thickness a boron and oxygen containing composition reacted with a nitrogen and hydrogen containing composition, and to a new improved process of so converting such precursor fiber that the resulting fiber has a greater thermal stability and corrosion resistance than the precursor fiber. Preferably, the resulting inorganic fiber consists essentially of and incorporates substantially throughout its thickness a boron nitride composition converted in situ from a precursor fiber having a maximum diameter of about 10 microns and consisting essentially of a boric oxide composition reacted with an ammonia composition.

The commercial development of boron nitride is of relatively recent origin, and has been primarily concerned with the production of this compound in various molded shapes and in powdered form. Because of its excellent thermal shock resistance, boron nitride can be used as a refractory up to a temperature of about 3000° F. (1646° C.) and higher in a nonoxidizing atmosphere, and up to a temperature of about 1300° F. (704° C.) in an oxidizing atmosphere. Boron nitride also has a high corrosion resistance, being inert to most organic solvents and many corrosive chemicals, as well as being resistant to attack by various molten materials such as iron, silicon, aluminum, cryolite, copper and zinc, and hence has found widespread use under various corrosive service conditions. In addition, boron nitride has been found to possess desirable electrical properties leading to an ever expanding number of applications in the electrical and electronic fields. The two most significant electrical characteristics of boron nitride are its high electrical resistivity and its high thermal conductivity, making it especially useful in various electrical and electronic applications requiring a material which simultaneously acts as an electrical insulator and as a thermal conductor.

One of the major drawbacks of boron nitride is the difficulty of fabrication into useful shapes, inasmuch as expensive hot pressing operations are required, followed by machining to produce useful articles. If boron nitride could be produced in fibrous form, the fabrication therefrom of numerous useful articles not only would be facilitated, but also would be much more economical. Such articles would combine the aforesaid advantageous properties of boron nitride with the versatility of a fibrous form.

However, as far as is known to us, no one has been able to produce boron nitride in fibrous form on a commercial scale. One of the earliest researchers in the production of boron nitride was one Emil Podszus of Germany, and a representative digest of his work is contained in U.S. Pat. No. 1,337,264, issued Apr. 20, 1920, and in an article entitled "Die Herstellung von keramischen Korpern aus reinen Stoffen, insbesondere aus Borstickstoff" (The Manufacture of Bodies from Pure Substances, Particularly from Boron Nitride) appearing on pages 153–157 on Volume 30 of "Zeitschrift für angewandte Chemie" published June 12, 1917.

In the aforesaid patent, Podszus discloses a method of making boron nitride bodies, first by forming a plastic mass from a finely ground mixture of boron nitride, organic binding medium and water which is used to form a sufficient amount of boric acid. Alternately, boric acid can be added to the boron nitride powder and binding medium. The plastic mass is shaped and dried in an oxidizing atmosphere to burn off the organic binding medium and to cause the boric acid to cement the particles of boron nitride together. Thereafter, the formed body is slowly glowed in a current of ammonia so that a body of boron nitride gradually is produced. Although Podszus does not disclose in this patent the precise manner in which the various boron nitride shapes are formed, such as thin tubes, threads and the like, he does disclose a procedure for so forming such bodies in the aforesaid article.

For example, in this article, on page 156, Podszus teaches mixing 66 percent $B_2O_3$ with 34 percent BN and grinding the powder with 35 parts of paraffin binder in order to obtain an intimate mixture which is warmed. The mass thus produced is, according to Podszus, sufficiently plastic that threads of a few tenths of a millimeter (i.e. about 300 microns) in diameter can be extruded from it.

In addition, on page 155 of the article, Podszus discloses that a filament of pure fused $B_2O_3$ after a 100 hour heating in $NH_3$ was surrounded by only an extraordinarily thin layer of BN 0.02 mm. (20 microns) thick in cross section. While at this point in the article, Podszus does not mention the diameter of the $B_2O_3$ filament, his characterization of the 20 micron thick layer of boron nitride as being "extraordinarily thin" indicates that the radius of the $B_2O_3$ filament was at least about one order of magnitude greater, that is about 200 microns, giving a diameter of about 400 microns. This conclusion is reinforced by the fact that Podszus considers a thin thread to be about 300 microns in the previously discussed portion of the article.

Moreover, considering the fact that Podszus concluded in the above article (page 155, last paragraph) that the manufacture of dense solid bodies of BN from $B_2O_3$ starting material was considerably difficult, especially BN filaments from $B_2O_3$ filaments, together with the total absence from the commercial scene of boron nitride fibers of any diameter, it becomes obvious that no one has been able heretofore to produce boron nitride fibers on any commercial scale, whether such fibers be extruded from a plastic, boron nitride containing mixture, or whether such fibers be formed by attempting to convert a starting $B_2O_3$ fiber into a BN fiber.

In contrast, the present invention is based on the discovery that the $B_2O_3$ precursor fiber must have a maximum diameter of not more than about 20–30 microns in order to produce a sufficiently porous structure allowing substantially complete penetration of the ammonia into such precursor fiber during the reaction between the $B_2O_3$ and $NH_3$ so as to permit a substantially complete conversion to a BN fiber. Precursor fibers above this maximum diameter apparently do not permit such complete penetration, but only a relatively thin surface penetration or coating of BN surrounding an amorphous core of $B_2O_3$, despite a wide variance in processing conditions.

It is evident that Podszus did not appreciate this fact, because he apparently abandoned using a $B_2O_3$ precursor filament in favor of a considerably more complicated and expensive extrusion process from a mixture of BN and $B_2O_3$, followed by nitriding. Even this was not a successful solution to the problem, not only because the paraffin binder would give such filaments little or no strength, but also because what Podszus considered to be fine threads were at least one order of magnitude greater than the maximum diameter of precursor fiber employed in the present invention.

Hence, the present discovery was completely unexpected, represents a radical departure from such prior art teachings, and makes possible, for the first time, commercial exploitation of boron nitride in fibrous form.

While the present invention is primarily concerned with the conversion of $B_2O_3$ fibers to BN fibers, it is not restricted to these compositions alone, but contemplates the conversion of any precursor fiber up to about 20–30 microns diameter and incorporating or comprising a boron and oxygen containing composition substantially throughout its thickness to a resulting fiber incorporating or comprising preferably substantially throughout its thickness to a resulting fiber incorporating or comprising preferably substantially throughout its thickness a boron and nitrogen containing composition by reaction with a nitrogen and hydrogen containing composition. For example, precursor fibers containing borax, boron oxide plus silica, calcium borate, various boro-silicates and similar compositions are contemplated, so long as the boron and oxygen containing composition extends substantially throughout the thickness of such precursor fiber. Likewise, the present invention contemplates, in addition to ammonia, any nitrogen and hydrogen containing compound, such as urea, hydrazine, ammonium chloride and the like. In addition, the various boron and nitrogen containing compositions, which form as a result of the reaction between the boron and oxygen containing compositions and the nitrogen and hydrogen containing compositions at various stages of the inventive process, also fall within the scope of the present invention.

Accordingly, an object of the present invention is to provide such a resulting fiber incorporating a boron and nitrogen containing composition having, by weight, a boron content ranging from about 28 to about 43.6 percent and a nitrogen content ranging from about 8.5 to about 63 percent, and preferably incorporating substantially throughout its thickness, a boron content ranging from about 30.5 to about 43.6 percent and a nitrogen content ranging from about 29 to about 63 percent.

Another object is to produce such a resulting fiber consisting essentially of and incorporating substantially throughout its thickness a boron nitride composition converted in situ from a precursor fiber having a maximum diameter of about 10 microns, consisting essentially of and incorporating substantially throughout its thickness a boron oxide composition reacted with an ammonia composition, and wherein the boron nitride composition has, by weight, a boron content ranging from about 38.9 to about 43.6 percent and a nitrogen content ranging from 40 to about 59 percent, with a preferred nitrogen range between about 40 and about 56.4 percent.

A further object is to provide a new and improved process of so converting such precursor fiber to such resulting fiber wherein the reaction is caused and continued in such a manner that the desired boron and nitrogen containing composition, and preferably boron nitride composition is produced.

A still further object is to provide such a process wherein the reaction readily is controlled in such a manner that the reaction follows a desired path, resulting in a fiber possessing not only the desired boron and nitrogen containing composition, but also the preferred boron nitride composition, and which resulting fiber has either a relatively high corrosion resistance after the conversion reaction ends, or can be provided readily with increased corrosion resistance.

Still another object is to provide such a process wherein the corrosion resistance of the resulting fiber can be increased either by controlling the conversion reaction for this purpose or by stabilizing treatment following the conversion reaction, or by a combination of such control and stabilizing treatment.

Additional objects and advantages of the present invention will become apparent upon consideration of the following detailed description and accompanying drawings wherein.

In order to convert a $B_2O_3$ precursor fiber to a boron nitride fiber, it is, of course, necessary to produce the $B_2O_3$ fiber in the first instance. This may be done by spinning continuous $B_2O_3$ fibers from a $B_2O_3$ melt and winding the same upon a reel in an atmosphere protected from moisture, and then following the inventive conversion process to be described below. Alternatively, the $B_2O_3$ precursor fibers may be blown in staple form from a $B_2O_3$ melt, and then so converted. In either case, the overall process may be continuous with appropriate equipment, or the $B_2O_3$ fibers may be stored in a suitable moisture-free atmosphere prior to the desired conversion.

Although the $B_2O_3$ fibers employed in the following examples of the inventive conversion process were actually spun in continuous form from a $B_2O_3$ melt, wound upon reels and then converted, the present invention is equally adapted to the conversion of fibers of the staple variety, as opposed to fibers of continuous nature. This will become evident from the various examples, and particularly example 16, wherein continuous fibers chopped into 18 in. and 4 in. lengths were employed in the inventive process.

While a more detailed discussion of the preparation of the $B_2O_3$ fibers could be presented, the same is considered sufficient, inasmuch as such preparation of $B_2O_3$ fibers forms no part of the present invention.

With this background in mind, the inventive process may be generally described as having two basic phases. The first is the reaction or nitriding phase, during which the precursor fiber is converted to the resulting fiber in accordance with the general equation:

$$aB_2O_3 a8zbNH_3 \longrightarrow cBN + dH_2O.$$

The second phase is the stabilizing phase wherein the corrosion resistance of the resulting fiber is increased by heat treatment either during, after, or both during and after the conversion reaction.

Considering the reaction or nitriding phase in greater detail, the first reaction which occurs as the $B_2O_3$ precursor fiber is heated in $NH_3$, is that of adding a protective shield of a nitrogen and hydrogen containing composition to the outer surface of the $B_2O_3$ fiber. This shield not only retains the fibrous form, but also prevents fusing of the fibers together. Such addition reaction extends from room temperature up to above 250°–300° C. Above about 300° C. and up to about 500° C., the $B_2O_3$ fiber, if having a maximum diameter of not more than about 20–30 microns, develops a highly porous structure, accompanied by a weight loss and the giving off of water vapor according to the aforesaid general equation. Thus, the $NH_3$ is able to penetrate substantially throughout the thickness of the $B_2O_3$ fiber, allowing the boron, nitrogen, hydrogen and oxygen to react, and begin the formation of various intermediate boron and nitrogen containing compositions, which also contain hydrogen and oxygen. For convenience and simplicity, the hydrogen and oxygen may be considered to be present as $H_2O$, although this is only a partial explanation of what actually is occurring, as various NH and BO groups also are probably present.

Thus, the essential reaction in the conversion process has now begun. To initiate or cause this reaction, we have found that the $B_2O_3$ precursor fiber may be heated in $NH_3$ at a temperature rise ranging from as little as 25° to as much as 5000° per hour up to a final temperature between over 300° and about 1500° C., while simultaneously subjecting the precursor fiber to a $NH_3$ current having a flow rate ranging between about 0.025 and 6 liters/min./gram of fiber.

If the conversion reaction is permitted to continue under the initial conditions of temperature rise and $NH_3$ flow rate, any number of intermediate and final boron and nitrogen containing compositions may be formed having by weight, a boron content ranging between about 28 and 43.6 percent and a nitrogen content ranging between about 8.5 and 63 percent. However, it is preferred that the boron and nitrogen contents range between about 30.5 and 43.6 percent and about 29 and 63 percent, respectively, to ensure substantially complete penetration or extension of the boron and nitrogen containing composition throughout the thickness of the resulting fiber.

However, in order to produce resulting fibers which not only consist essentially of a boron nitride composition, but also are either relatively stable against corrosion at the end of the conversion reaction, or readily can be so stabilized, we have found it necessary to control the conversion reaction in order to densify the fibers as they are being converted. This can be done in a variety of ways. One way is to reduce the $NH_3$ flow rate below the final temperature. Another is to rapidly heat the precursor fiber from a temperature below the final temperature to the final temperature at which the flow rate is reduced, and this is the preferred way. Still another way is to add an oxygen containing composition to the ammonia throughout the reaction. The preferred way has been found to be the most efficient and effective way to ensure the production of a resulting fiber which not only has a relatively high corrosion resistance after nitriding, but also has the preferred boron nitride composition. The first way has also proved effective for this purpose, but requires a longer nitriding time and a higher final temperature.

Concerning increasing the corrosion resistance of the resulting fiber, this, as noted above, constitutes the second basic phase of the invention process, and mention has already been made of this phase during the nitriding phase. However, in each instance, it has been found that whether or not a particular way of controlling the reaction has produced a beneficial effect on corrosion resistance, this property can be increased further by stabilizing heat treatment following the conversion reaction. This stabilization may also be carried out in a variety of ways. First, the resulting nitrided fiber can be heated in an inert atmosphere at a temperature which may be below, but which is usually above, the final nitriding temperature. Second, the nitrided resulting fiber can be subjected to an oxygen containing atmosphere at a temperature usually below the final temperature, followed by heating at a higher temperature in an inert atmosphere, and third, the nitrided fiber can be heated in a nitrogen, hydrogen and oxygen containing atmosphere instead of heating in an inert atmosphere. All three of these alternatives have produced resulting fibers which are highly stable against corrosion. However, the first alternative, in combination with the preferred reaction control, is most preferred, because these two treatments produce the desired results in the most efficient and effective manner.

In order to highlight the present invention, the following examples are given. However, there are certain conditions which are common to more than one example, and these conditions are set forth below in order to avoid repetition.

Samples of less than 2 grams were nitrided in a 1 in. diameter tube furnace. Samples ranging from 2 to 4 grams were nitrided in a 2 in. diameter tube furnace, and samples greater than 4 grams were nitrided in a 3½-in. diameter tube furnace. Likewise, unless otherwise specified, the $B_2O_3$ fibers were continuous in nature and spread or fluffed out in wool form over the cross section of the tube furnace, which was normally horizontal, in order to ensure optimum contact by the $NH_3$.

In view of the fact that the flow rate of $NH_3$ is dependent upon the size of the fiber sample and the size of the nitriding tube, such flow rate has been adjusted in accordance with the particular requirements of each sample and the particular tube furnace in which it is nitrided. Gas flow rates as indicated herein are measured at standard room temperature and pressure and are on the basis of the unit weight of precursor fibers. In addition, it is to be noted that samples which were heated to a temperature higher than 1400° C. were heated in graphite containers.

Moreover, wherever analysis of boron and nitrogen content is set forth herein, it is on a weight percent basis.

EXAMPLE 1

3.7142 grams of $B_2O_3$ fibers having a diameter of 8 microns were nitrided using a temperature program of 200° per hour rise from 100° C. and were held for 11 hours at 1000° C. The $NH_3$ flow rate was 4000 cc./min. (1.08 liters/min./gram), yielding 2.5860 grams. 2.4948 grams of these fibers were further nitrided at 1400° C. for 6.75 hours, using 2000 cc./min. (0.802 liter/min./gram) of $NH_3$, yielding 2.4747 grams, analyzing at 42.51 percent B and 55.97 percent N. After immersion in water at 100° C. for 3 hours, these fibers lost 54.8 percent in weight.

0.6433 gram of the resulting fibers nitrided at 1400° C. were treated for 1 hour at 2000° C. in a nitrogen atmosphere, yielding 0.6201 gram (3.4 percent weight loss). After the same treatment in water at 100° C., these fibers lost 15.2 percent in weight.

While these fibers were highly unstable against corrosion after nitriding, following stabilizing treatment, their corrosion resistance was substantially increased, although not to a high degree. Nevertheless, such stabilized fibers could be considered as at least partially stabilized, and therefore sufficiently stable for insulation purposes.

EXAMPLE 2

Two grams of 7 microns diameter $B_2O_3$ fibers were nitrided using a temperature program of 200° per hour rise from 100° to 1000° C., and were given a final nitriding treatment of 3 hours at 1400° C. The $NH_3$ flow rate was 4000 cc./min. (2 liters/min./gram) from 100° to 600° C., and 50 cc./min. (0.025 liter/min./gram) at temperatures over 600° C. These fibers analyzed at 41.65 percent B and 54.97 percent N, and showed a weight loss of 0.4 percent after 5 hours immersion in boiling water.

A sample of these resulting fibers, when treated at 1800° C. in a nitrogen atmosphere for 1 hour, lost 3.8 percent in weight, but only showed a weight loss of 0.9 percent after 20 hours in boiling water. The resulting fibers, even without further stabilizing treatment in the nitrogen atmosphere, were quite stable, and could be used without such further treatment in electrical applications where a high degree of corrosion resistance is required. At the same time, their stability was measurably increased by such stabilizing treatment, because without such stabilizing treatment they would have lost at least about 1.6 percent after 20 hours in boiling water, which would be almost twice the weight loss after stabilization.

This example, in comparison with example 1, indicates the importance of reducing the $NH_3$ flow rate by over 98 percent at 600° C., as compared to a reduction of only about 25 percent at 1000° C. in example 1. The advantage of the procedure of this example over example 1 is the tremendously increased corrosion resistance obtained both after nitriding and after stabilization.

EXAMPLE 3

33.8 grams of 8 microns diameter $B_2O_3$ fibers were nitrided using a temperature program of 100° per hour rise from 100° to 700° C., at which temperature the fibers were held for 2 hours. A $NH_3$ rate of 36,000 cc./min. (1.065 liters/min./gram) was used, yielding 28.2 grams of fiber. The nitriding was then continued for 3.5 hours at 900° C. with a $NH_3$ flow rate of 12,000 cc./min. (0.426 liter/min./gram), yielding 25.1 grams.

These fibers were subsequently treated at various temperatures in a nitrogen atmosphere, and then tested for corrosion resistance to boiling water. The results are shown in table I.

TABLE I

| | Thermal treatment | | | Analysis | | | Boiling H$_2$O resistance 3 hours, percent wt. loss |
|---|---|---|---|---|---|---|---|
| | Temp., °C. | Time, hours | Wt. loss, percent | Percent B | Percent N | Percent C | |
| Run: | | | | | | | |
| A-1 | 1,700 | 1.0 | 10.8 | 41.59 | 51.22 | | 13.50 |
| A-2 | 1,800 | 1.0 | 15.7 | 41.55 | 54.97 | | 7.55 |
| A-3 | 2,000 | 0.5 | 15.9 | 42.79 | 55.55 | 1.02 | 4.10 |
| A-4 | 2,200 | 0.5 | 18.3 | 42.35 | 55.86 | 1.70 | 0.00 |

In all cases the resulting boron nitride fibers were uniform and flexible, the carbon pickup in runs A-3 and A-4 being from the graphite crucible. However, only run A-4, which was treated at 2200° C., was completely stable against corrosion. As has been shown in example 2 and as also will be demon-

EXAMPLE 4

Eleven samples containing 4 grams each, of 7 microns diameter $B_2O_3$ fibers were nitrided using a temperature prostrated below, it is not necessary to use such a high stabilizing temperature as 2200° C. in all cases, particularly when the cutback temperature of the $NH_3$ flow rate is reduced, and when the amount of reduction in the flow rate is considerably increased. In the present example, the flow rate reduction was about 60 percent.

gram of 200° per hour rise from 100° to 600° C. A $NH_3$ flow rate of 5000 cc./min. (1.25 liters/min./gram) was used for each run, up to 600° C. 37.2 grams of the fibers thus obtained were further nitrided at 1000° for 22 hours, using a reduced ammonia flow rate of 300 cc./min. (0.089 liter/min./gram) for temperatures above 600° C. 30.6 grams of uniform and flexible fibers were obtained, and an analysis of the fiber samples was made from: (a) the $NH_3$ entrance side of the furnace, (b) the center of the batch, and (c) the $NH_3$ exit side, producing the following results: (a) 40.85 percent B, 51.06 percent N; (b) 40.50 percent B, 49.85 percent N; and (c) 41.36 percent B, 50.36 percent N.

Twenty-eight grams of these resulting fibers were treated for 2 hours at 1800° C. in a nitrogen atmosphere, producing a yield of 24.5 grams of BN fibers, analyzing as 42.64 percent B and 56.23 percent N. These fibers had an average apparent density of 1.87 grams/cc. and showed a 1.1 percent weight loss after 24 hours in boiling water.

The effect of reducing the flow rate by approximately 93 percent at a temperature of approximately 600° C., resulting in substantially increased stabilization of the fibers is quite evident from this example. This is particularly true, in that stabilizing treatment at 1800° C. provided a greater stability than even a 2000° C. stabilizing treatment in example 3 wherein the $NH_3$ flow rate was only reduced by 60 percent at a temperature of 700° C.

EXAMPLE 5

Twelve samples of 0.8 gram each of $B_2O_3$ fibers, and of varying diameter, were nitrided using a temperature program of 200° per hour rise from 100° to 700° C. The nitriding was continued for various lengths of time at 700° C., and a $NH_3$ flow rate of 3000 cc./min. (3.75 liters/min./gram) was employed throughout the entire reaction. The results are shown below in table II.

TABLE II

| Run | Fiber Diameter Microns | Time Hours | Analysis % B | % N |
|---|---|---|---|---|
| B-1 | 34.0 | 0.5 | 34.82 | 21.85 |
| B-2 | 34.0 | 2.0 | 35.79 | 29.86 |
| B-3 | 34.0 | 14.0 | 37.07 | 31.92 |
| B-4 | 17.5 | 0.5 | 36.47 | 34.23 |
| B-5 | 17.5 | 2.0 | 36.91 | 40.63 |
| B-6 | 17.5 | 14.0 | 38.54 | 44.91 |
| B-7 | 10.8 | 0.5 | 36.99 | 41.95 |
| B-8 | 10.8 | 2.0 | 37.34 | 47.27 |
| B-9 | 10.8 | 14.0 | 37.98 | 49.49 |
| B-10 | 7.8 | 0.5 | 35.57 | 43.15 |
| B-11 | 7.8 | 2.0 | 37.73 | 46.61 |
| B-12 | 7.8 | 14.0 | 37.63 | 46.97 |

While the various runs of this example were not continued above 700° C., they do indicate definitely that the maximum diameter of the precursor fiber must not be more than about 20-30 microns in order to permit substantially complete penetration of the $B_2O_3$ fiber. This conclusion is reached by first comparing runs B-6 (17.5 microns), B-9 (10.8 microns) and B-12 (7.8 microns) as to boron and nitrogen content after 14 hours holding time at the same temperature. As is evident, the boron and nitrogen contents are quite close to each other, and are all close to the preferred boron nitride composition, which was defined previously as having, by weight, a boron content ranging between about 38.9 and 43.6 percent and a nitrogen content ranging between about 40 and 59 percent. In contrast, the nitrogen content of the 34 microns $B_2O_3$ fiber after 14 hours, leveled off at about 32 percent, which is substantially below the minimum required for the above-defined boron nitride composition. This indicates that in this higher diameter range it would be extremely difficult to increase the nitrogen content to a value approaching 40 percent, even by prolonged heating at a higher temperature. Hence, in order to avoid a mere BN coating operation on the $B_2O_3$ fiber, it is necessary that such fiber have a maximum diameter of not more than about 20–30 microns. Moreover, fibers having diameters over 20–30 microns are characterized by very low tensile strengths, low flexibility, nonuniformity in diameter, and a high incidence of defects.

EXAMPLE 6

Four samples of 2 grams each of 7–8 microns diameter $B_2O_3$ fibers were nitrided using a temperature program of 200° per hour rise from 100° to 1000° C., and the nitriding was contained for 2 hours at 1000° C. The $NH_3$ flow rate was 4000 cc./min. (2 liters/min./gram), to the particular reducing or cutback temperature, which ranged from 500° to 800° C., and a flow rate of 50 cc./min. (0.025 liter/min./gram) was employed for the temperatures above the cutback temperature. The resulting fibers were subsequently treated at 1800° C. for 1 hour in a nitrogen atmosphere, and then tested for weight loss in boiling water. The results are shown in table III below.

TABLE III

| | Nitriding | | Thermal treatment | |
|---|---|---|---|---|
| | $NH_3$ cut temp.,°C. | Analysis after 2 hrs. at 1,000° C. | Percent wt. loss 1 hr. at 1,800° C. | Percent wt. loss 24 hrs. in $H_2O$ at 100° C. |
| | | Percent B | Percent N | | |
| Run: | | | | | |
| C-1 | 500 | 41.23 | 49.71 | 12.2 | 1.4 |
| C-2 | 600 | 40.51 | 52.82 | 12.5 | 2.5 |
| C-3 | 700 | 40.22 | 48.28 | 14.8 | 2.6 |
| C-4 | 800 | 40.84 | 51.01 | 11.0 | 17.6 |

In each case the resulting stabilized boron nitride fibers were uniform and flexible, and with the exception of run C-4, were stable for stringent electrical applications, because by extrapolation run C-4 fibers would not retain at least 98 percent of their weight after 3 hours in boiling water. Even this run of fibers would be quite useful for thermal insulating and laminating purposes, however.

EXAMPLE 7

Three samples of 2 grams each, of 7 microns diameter $B_2O_3$ fibers were nitrided, using a temperature program of 200° per hour rise from 100° to 1000° C., and the nitriding was continued for 1 hour at this latter temperature. The initial $NH_3$ rate was 4000 cc./min. (2 liters/min./gram) up to 600° C., and 50 cc./min. (0.025 liter/min./gram) for run D-1, 100 cc./min. (0.05 liter/min./gram) for run D-2, and 200 cc./min. (0.10 liter/min./gram) for run D-3, for temperatures greater than 600° C. for 1 hour in a nitrogen atmosphere, and then were tested for weight loss in boiling water, producing the results shown in table IV.

TABLE IV

| | Nitriding | | Thermal treatment | |
|---|---|---|---|---|
| | $NH_3$ rate temp., 600° C. cc./min. | Analysis after 1 hr. at 1,000° C. | Percent wt. 1 hr. at 1,800° C. | Percent wt. 20 hrs. at 100° C. |
| | | Percent B | Percent N | | |
| Run: | | | | | |
| D-1 | 50 | 40.50 | 48.36 | 14.6 | 0.7 |
| D-2 | 100 | 40.37 | 51.36 | 10.7 | 3.2 |
| D-3 | 200 | 40.39 | 54.02 | 8.7 | 29.9 |

Once again the resulting stabilized boron nitride fibers were, in all cases, both uniform and flexible. However, it is to be noted that in run D-3 the initial $NH_3$ flow rate was only cut back by about 95 percent, whereas in runs D-1 and D-2, the cutback was 98.75 percent and 97.5 percent, respectively. Thus, while the fibers of run D-3 would be useful for thermal insulating and ablation purposes they would not be suitable for stringent electrical applications, where a considerably higher degree of corrosion resistance is required, i.e. a weight retention of at least 98 percent after 3 hours in boiling water.

Comparing examples 6 and 7, it will be evident that in order to produce a highly stable fiber, under the conditions of these examples, it is necessary to reduce the $NH_3$ flow rate at a temperature range between 500° and 700° C., and to reduce such flow rate by an amount in excess of 95 percent.

EXAMPLE 8

0.9723 gram of 5.1 microns diameter $B_2O_3$ fibers were nitrided, using a temperature program of 200° to 600° C., and then continuing the nitriding for 1 hour at 1000° C. The initial $NH_3$ flow rate was 2000 cc./min. (2.06 liters/min./gram) up to 600° C., and 1000 cc./min. (1.03 liters/min./gram) for temperatures in excess of 600° C. The resulting yield was 0.6550 gram, and the resulting converted fibers analyzed as 40.14 percent B and 55.76 percent N. 0.5046 gram of these fibers were subsequently treated for 1 hour at 1800° C. in a nitrogen atmosphere yielding 0.4506 gram (10.7 percent weight loss). Testing for corrosion resistance, by immersion in boiling water for 3 hours, produced a weight loss of 14.6 percent, and thus a partially stabilized resulting fiber.

While this fiber would find use as reinforcement in plastic laminates for ablation purposes, and would have sufficient corrosion resistance for use as thermal insulation, which requires not more than about a 15 percent weight loss after such 3 hours boiling water test, it would not be useful for electrical applications which require a high degree of corrosion resistance, represented by a weight loss of not more than about 1 or 2 percent after such boiling water test.

EXAMPLE 9

0.5398 gram of 8 microns diameter $B_2O_3$ fibers were nitrided using a temperature program of 200° per hour rise from 100° to 600° C., and then continuing the nitriding for 1 hour at 1000° C. The $NH_3$ flow rate was 3000 cc./min. (5.56 liters/min./gram), and the yield was 0.3748 gram of resulting fibers, analyzing as 39.41 percent B and 56.52 percent N. 0.2901 gram of these fibers were subsequently treated for 1 hour at 1800° C. in a nitrogen atmosphere, yielding 0.2634 gram (9.2 percent weight loss). Following this, the fibers showed a weight loss of 26.3 percent, when tested for 3 hours in boiling water.

This example illustrates quite pointedly the necessity for cutting back the $Nh_3$ flow rate, because when there is no such reduction, the resulting fiber, even though subjected to stabilizing treatment, is still highly unstable, even though its corrosion resistance was improved by such stabilizing treatment.

EXAMPLE 10

0.7709 gram of 8 microns diameter $B_2O_3$ fibers were nitrided using a temperature program of 400° per hour rise from 100° to 600° C., and then continuing the nitriding for 0.5 hour at 1000° C. The $NH_3$ flow rate was 2000 cc./min. (2.6 liters/min./gram) to 600° C., and 1000 cc./min. (1.3 liters/min./gram) for temperatures over 600° C. The yield was 0.5349 gram, and the boron nitride content analyzed as 39.10 percent B and 53.44 percent N. 0.3821 gram of these resulting converted fibers were subsequently stabilized at 1800° C. for 1 hour in a nitrogen atmosphere, yielding 0.3514 gram (8.0 percent weight loss). Those fibers, which were subjected to the stabilizing treatment, showed a weight loss of 21.8 percent, When tested for 3 hours in boiling water.

This example illustrates the necessity for making a drastic reduction in the $NH_3$ flow rate in order to provide a fiber which can be rendered stable by further heat treatment. In this example, the cutback was only 50 percent, and the high weight loss, as a result of the boiling water test, illustrates the relatively high instability of such fibers.

EXAMPLE 11

One gram of 7 microns diameter $B_2O_3$ fibers were nitrided at a temperature program of 200° per hour rise from 100° to 600° C., and were held for 1 hour at 600° C. The initial $NH_3$ flow rate was 2000 cc./min. (2 liters/min./gram). The fibers, which were treated to 600° C., were analyzed as containing, by weight, 35.31 percent B and 44.08 percent N. After nitriding for 1 hour at 600° C., the fibers were heated to 980° C. in $N_2$ which replaced the $NH_3$. At 980° C. the $N_2$ was replaced with $NH_3$ at a reduced flow rate of 500 cc./min. (0.5 liters/min./gram) for 1.5 hours.

These fibers were then heated for 0.75 hour at 1800° C. in a nitrogen atmosphere, and thereafter subjected to boiling water for 3 hours, resulting in a 26.6 percent weight loss.

EXAMPLE 12

The procedure of example 11 was repeated exactly, except that the precursor fibers *were not* held for 1 hour at 600° C., but at this temperature the fibers, which analyzed at 33.91 percent B and 28.04 percent N, were taken to the elevated temperature in nitrogen, which was then replaced with the same reduced flow rate of ammonia. After the same stabilizing treatment, the same boiling water test, these resulting fibers suffered weight loss of only 1.5 percent.

Both of these examples are illustrative of the preferred procedure for carrying out the inventive process, except that example 11 graphically shows the criticality of holding the precursor fibers for 1 hour at 600° C., instead of heating these fibers directly to the final temperature in nitrogen, as was done in example 12. This hold, even though it was relatively short, produced a highly unstable fiber, as compared to the highly stable fiber of example 12.

EXAMPLE 13

Two grams of 7 microns diameter $B_2O_3$ fibers were nitrided, using a 200° per hour temperature rise from 100° to 1000° C., and the nitriding was continued for 3 hours at 1000° C. The initial $NH_3$ rate was 4000 cc./min. (2 liters/min./gram) up to 600° C. The resulting fibers analyzed as 40.18 percent B and 49.61 percent N, and a sample of these fibers lost 59.1 percent in weight after 3 hours in boiling water.

However, after another sample of the resulting fibers was treated for 1 hour in a nitrogen atmosphere at 1800° C. (losing 11.3 percent in weight), they retained 99.8 percent of their weight after 3 hours in boiling water.

The significance of this example is that even though the resulting fiber may be highly unstable in boiling water after nitriding, it can be made to be quite stable against corrosion by proper heat treatment.

EXAMPLE 14

The procedure of example 13 was repeated up to 600° C., at which temperature the partially converted fibers analyzed at 33.96 percent B and 27.51 percent N. However, at 600° C. the $NH_3$ flow was cut off, as was done in examples 11 and 12, the fibers were then purged with $N_2$ and heated in such atmosphere to 1000° C., at a very rapid rate, i.e. in about 5 minutes, which is equivalent to about 4800° per hour. At this temperature the $N_2$ was replaced with $NH_3$, but at the same reduced flow rate as in example 13 for 3 hours. The converted resulting fibers analyzed at 40.73 percent B and 51.77 percent N, and when tested in boiling water, showed a weight loss of 10.7 percent after 3 hours.

A sample of the converted fibers was then treated at 1800° C. for 1 hour in a nitrogen atmosphere and had a boiling water stability represented by a 0.1 percent weight loss after 3 hours.

These two examples point out the beneficial results obtained by cutting off the ammonia flow at a cutback temperature of 600° C. and rapidly heating the partially converted fibers directly to the final temperature of 1000° C. in nitrogen, after which the nitriding in ammonia is continued at a rate reduced by over 98 percent to complete the conversion. In example 13, wherein no such direct heat treatment in nitrogen occurred during the nitriding procedure, the resulting fibers were highly unstable, and required further heat treatment in a nitrogen atmosphere to produce the desired high stability. In example 14 on the other hand, the nitriding treatment produced a relatively stable fiber, which could be used for thermal insulation purposes, without further heat treatment. Thus, example 14, like example 12, represents a preferred reaction control procedure in accordance with the invention.

EXAMPLE 15

Four grams of 7-8 microns diameter $B_2O_3$ fibers were nitrided using a $NH_3$ flow rate of 5000 cc./min. (1.2 liters/min./gram) and a 200° per hour temperature rise to 600° C. At this temperature the $NH_3$ flow rate was reduced to 100 cc./min. (0.025 liter/min./gram) up to 1000° C., at which temperature nitriding was continued for 2 hours. This treatment produced a yield of 3 grams of fibers analyzing at 39.85 percent B and 50.53 percent N. These resulting fibers were then heated for 1 hour at a stabilizing temperature of 1800° C.; a sample was removed, and the remainder gas heated for 1 hour at 2200° C., producing the following results shown in table V.

TABLE V

| Temp., ° C. | Percent wt. loss in thermal treatment | Percent wt. loss in boiling $H_2O$ | Density, g./cc. | Tensile strength, p.s.i. | Modulus of elasticity, p.s.i. |
|---|---|---|---|---|---|
| 1,800 | 14.2 | 1.6 in 20 hrs | 1.976 | | |
| 2,200 | 0.5 | 0.1 in 75½ hrs | 1.963 | 94,000 | 6×10⁶ |

From this example it can be seen that the sample treated at a stabilizing temperature of 1800° C. was considerably less stable in boiling water than the sample treated at 2200° C. At the same time, both were of such highly stability as to be quite useful for even the most stringent of electrical applications. Moreover, the tensile strength of the 2200° C. fiber was quite high, and its relatively low modulus indicated high flexibility.

It is also worthy of note that the initial diameter of the $B_2O_3$ fibers, which averaged 7.5 microns, shrunk to a final diameter of about 6.5 microns in the resulting stabilized fiber, indicating that shrinkage of the fiber may occur during the inventive process, together with a substantial increase in density over the original density of about 1.8 grams/cc. of the $B_2O_3$ fibers, under the proper nitriding conditions.

EXAMPLE 16

Six grams of 6 microns diameter $B_2O_3$ fibers were hung in 18 in. parallel lengths in a 3½-in. diameter vertical tube furnace. The fibers were nitrided using a 200° per hour temperature rise from 150°-650° C. and an initial $NH_3$ flow rate of 10,000 cc./min. (1.67 liters/min./gram) was used to the cutback temperature of 650° C. These fibers were then cut to 4 in. lengths and placed parallel in a 2 in. diameter horizontal tube furnace, being heated rapidly to 1000° C. and held at this temperature for 2 hours with a $NH_3$ flow rate of 100 cc./min. (0.0167 liter/min./gram). The yield was 4.3 grams with a nitrogen analysis of 49.07 percent. A sample of the resulting nitrided fibers was heat treated at a stabilizing temperature of 1600° C. in a nitrogen atmosphere for 0.5 hour, with a weight loss of 6.3 percent. Another sample of such fibers was heat treated in the same manner but at 1800° C. with a weight loss of 11.7 percent. The density of the fibers after nitriding was 1.81 grams/cc. and after heat treatment at 1800° C., was 1.63 grams/cc.

This example illustrates the feasibility of employing vertical or horizontal tube furnaces, or both types in sequence.

EXAMPLE 17

1.1127 grams of 4.5 microns diameter $B_2O_3$ fibers were nitrided using 2 liters/min. (1.8 liters/min./gram) of $NH_3$ at a 200° per hour rise to 600° C., then heated to 1000° C. in 0.5 hour and held for 80 minutes, yielding 0.7635 gram. The analysis was 40.15 percent B and 56.22 percent N. A 0.2886 gram sample of these fibers was treated with $O_2$ at 1 liter/min. (3.47 liters/min./gram) for 15 minutes at 700° C., yielding 0.2932 gram (1.7 percent weight gain). This sample was stabilized at 1800° C. in $N_2$ for 15 minutes, yielding 0.2249 gram (23.2 percent weight loss), analyzing at 40.93 percent B and 56.63 percent N, with a density of 1.96 grams/cc. After 3 hours in boiling water, this sample lost only 1.1 percent in weight.

A 0.3387 gram sample of these nitrided fibers, without such $O_2$ treatment, was stabilized in the same manner, yielding 0.3134 gram (7.5 percent weight loss) and analyzing at 40.45 percent B and 54.54 percent N, with a density of 1.53 grams/cc. After 3 hours in boiling water, this sample lost 19 percent in weight.

Thus, the oxygen treatment following nitriding, and prior to the heating in nitrogen, increased the corrosion resistance of the fibers over those which were not subjected to such oxygen treatment. Actually any suitable oxygen containing composition, such as $H_2O$ vapor, could have been employed instead of the pure oxygen with substantially the same results.

EXAMPLE 18

Two grams of 6.3 microns $B_2O_3$ fibers were nitrided at a 200° per hour rise to 1000° C. and held for 14 hours in a $NH_3$ current flowing at 4 liters/min. and mixed with $O_2$ at 0.2 liter/min., making for a total flow of 4.2 liters/min. (2.1 liters/min./gram). The analysis was 41.68 percent B and 53.66 percent N. After 3 hours in boiling water, these fibers lost 22.4 percent in weight. These fibers were then stabilized at 1800° in $N_2$ for 1 hour. After 3 hours in boiling water, the fibers lost 15.3 percent in weight.

This example demonstrates the feasibility of mixing oxygen or water vapor or like oxygen containing compositions with the ammonia during nitriding to control the conversion reaction, instead of reducing the $Nh_3$ flow rate. Although the nitrided fibers were relatively unstable, they were more stable than those of examples 1 and 13 after nitriding only, and they became at least partially stabilized after heating in nitrogen.

EXAMPLE 19

Two samples of 2 grams each of 6.3 microns diameter $B_2O_3$ fibers were nitrided at 200° per hour to 900° C. and held for 3 hours, using 2 liters/min. $NH_3$ and 0.1 liter/min. $O_2$, totaling 2.1 liters/min. (1.05 liters/min./gram). The resulting fibers analyzed at 40.11 percent B and 52.20 percent N. One sample was stabilized at 1800° C. in $N_2$ for 1 hour, losing 11.8 percent in weight and analyzing at 42.66 percent B and 55.52 percent N. After 3 hours in boiling water, these fibers lost 6.0 percent in weight. The other sample was treated at 1500° C. for 3 hours in a gaseous mixture containing, by weight, 96 percent $NH_3$ and 4 percent $O_2$, analyzing at 41.7 percent B and 55.68 percent N and having a weight loss of only 1.4 percent after 3 hours in boiling water.

Hence, under the conditions of this example, treating with $NH_3$ and $O_2$ produced a greater corrosion resistance than heating in $N_2$.

EXAMPLE 20

Following substantially the procedure of example 1, but without stabilizing treatment, 17 samples of about 0.5 gram each, of $B_2O_3$ precursor fibers having diameters in the 5-31 microns range were nitrided, and then subjected to a standard tensile test in order to determine the relationship between fiber diameter and tensile strength. These two properties of these fibers, which were unstable, are represented on the curve U in FIG. 1.

Likewise, 14 samples of about 0.5 gram each of $B_2O_3$ fibers having diameters in the 5-25 microns range were nitrided substantially in accordance with the procedure of example 1, followed by stabilizing heat treatment. These fibers are considered to be at least partially stabilized fibers in that they represent a weight retention of about 85 percent after 3 hours in boiling water. These fibers were likewise subjected to the same standard tensile test and the results are shown by the curve P of FIG. 1.

Figure 1:
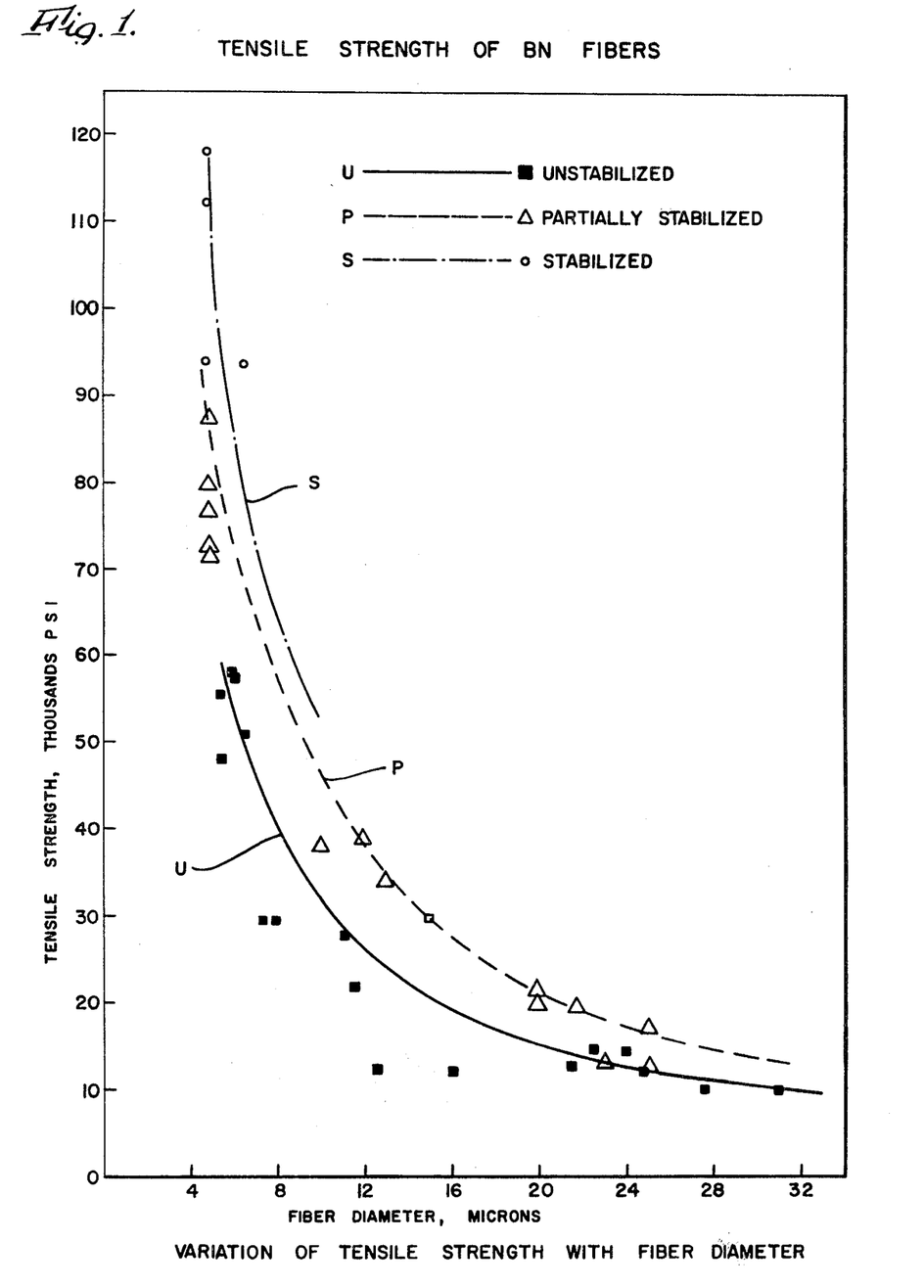
FIG. 1 is a plot of fiber diameter versus tensile strength, and indicates how the tensile strength of fibers produced in accordance with the inventive process is affected not only by fiber diameter, but also by stabilizing heat treatment against corrosion resistance.

Referring now to curve S of FIG. 1, four samples of about 0.5 gram each of $B_2O_3$ fibers having diameters in the 4-8 microns range were nitrided and stabilized substantially in accordance with the procedure of example 14. These were, of course, highly stable fibers.

Comparing the results shown in curves U, P and S, it is evident that the tensile strength increases as the fiber diameter decreases, and that this property varies from a minimum of about 10,000 p.s.i. for an unstable 20–30 microns diameter fiber to well over 100,000 p.s.i. for a highly stabilized 4.5–5 microns diameter fiber. In fact, tensiles over 200,000 p.s.i. have been obtained for such 4.5–5 microns fiber.

It is also apparent that increased corrosion resistance of a fiber has a beneficial effect on tensile strength for a given diameter. This becomes evident by a visual comparison of the relative positions of curves U, P and S.

Continuing with FIG. 1, it is noted that as the fiber diameter decreases there is a gradual increase in tensile strength down to about a 15 microns diameter, unstabilized fiber, which has a minimum tensile strength of about 20,000 p.s.i., and that there is an increasingly sharp increase in tensile strength in the 4–10 microns diameter range, with a minimum tensile strength of about 30,000 p.s.i. being shown for an unstabilized 10 microns diameter fiber. The fibers in this 4–10 microns diametral range display excellent handling characteristics and are sufficiently flexible to be tied into a knot. Larger diameter fibers become increasingly brittle, and break during this knot test.

In addition to the facts that 10 microns or smaller diameter $B_2O_3$ fibers are more quickly converted to BN fibers, and that these resulting fibers usually exhibit substantially higher tensiles, there is another factor which influences the selection of such a diametral range as the preferred range. This factor is the presence of defects in resulting fibers of greater than 10 microns diameter. Actually, there are two types of defects which have been observed, and these are classified as internal defects and external defects, both of which have been found to be present in fibers in the range above 10 microns, but neither of which are normally present in the range of 10 microns and below, when following the teachings of the present invention. Examination of fibers of less than 10 microns diameter prepared substantially in accordance with example 4 shows that they are highly uniform in diameter throughout their length and are highly flexible, so as to compare favorably in these respects to commercially available glass fibers, while far surpassing such glass fibers in thermal and corrosive stability.

A number of process variations in the conversion of the $B_2O_3$ fibers to the BN fibers have been evaluated in order to eliminate these internal defects. However, no fibers have yet been observed without such defects in the range over 10 microns, and there does not appear to be any tendency toward improvement with change in process variables for such larger diameter fibers.

The other type of defect, the external defect, which has been observed, is characterized by a considerable reduction or construction in the diameter of the fiber in certain sections and an expansion or ballooning in other sections.

The external defect appears to be dependent upon two variables: (1) the diameter of the fiber and (2) the rate of programming during the reaction. This defect is rarely observed in fibers with diameters of 10 microns or less, and the frequency of defects increases with the larger diameter fibers. In a typical conversion of $B_2O_3$ fibers using a temperature rise of 500° C. per hour, fibers with diameters over 10 microns invariably display this external "necking down" defect, whereas those of 10 microns or less, under the same conditions, usually do not show such external defect. However, this type of defect can be induced in the 10 microns or less diameter fiber by placing the $B_2O_3$ fibers directly in a heated zone at 600° C. in a $NH_3$ atmosphere.

The external defect also appears to be dependent upon the ratio of thickness of the initial shield of a nitrogen and hydrogen containing composition to the diameter of the $B_2O_3$ fiber. This initial shield appears to form a stable shell which acts as a container for the molten center, while still permitting the formation of a porous structure for the desired conversion reaction. Thus, the narrower fibers appear to form this shell much more rapidly than the thicker fibers. From work done to date, it appears that a fiber of 5 microns diameter will require only a few minutes at the shell forming temperature, which is about 300°–500° C., as compared to about 30 minutes for a 20–30 microns diameter fiber.

Accordingly, there is a clear relationship between the nitriding conditions and the diameter of the $B_2O_3$ fibers being nitrided which results in one or both types of the defects discussed above, and these in turn have an adverse effect upon the tensile strength and flexibility of the resulting fiber. Hence, the fibers in the range of diameter from 10 microns or less show the greatest commercial promise, because they are substantially free from internal and external defects, and as a consequence, have the highest tensile strength and as a consequence, have the highest tensile strength and greatest amount of flexibility.

At the same time, fibers up to about 20–30 microns diameter, even though more brittle and of less tensile strength, do find use. For example, these fibers do have sufficient flexibility and tensile strength for use as reinforcement in plastic laminations, such as for ablation purposes, and if stable against corrosion to a weight loss of about 15 percent or less, after 3 hours immersion in boiling water, can also be used for thermal insulating purposes.

It is also expected that one or both of these types of defects can be reduced or eliminated by lowering the rate of programming to reaction temperature to a minimum of about 25° per hour. Hence, should special situations arise requiring the use of fibers up to about 20–30 microns diameter with relatively higher tensile strengths and greater flexibilities, it is expected that these requirements can be met by so reducing the rate of temperature rise. For the present, this is not economically feasible, because the time for elevating the fiber to the final or terminal temperature of nitriding for a relatively complete reaction would be approximately 30–40 hours at a 25° per hour rate rise to a final temperature of about 1000°, depending upon the initial temperature, which may vary from room temperature to about 300° C.

Hence, the fibers in the 10 or less microns diameter range are definitely preferred, since these fibers can be completely programmed to this temperature in a total time of about 5 hours by using a 200° rise per hour and down to about 15 minutes by using a temperature program of about 5000° per hour to a final temperature of about 1500° C. for fibers having a diameter of about 5 microns or less.

At the same time, it is to be noted that the temperature rise or program need not be uniform throughout the reaction. For example, a 200° per hour rise could be used up to about 600° C. and a 5000° per hour rise to a final temperature of about 1000° C. This was done in example 14. In essence, the temperature rise or program is adjusted, depending upon the fiber diameter, in order to cause the reaction to proceed along a desired path.

- EXAMPLE 21

The various nitriding and stabilizing conditions of the inventive process will now be discussed in detail by reference to FIG. 2, which is a plot of boron versus nitrogen content as the $B_2O_3$ precursor fiber is converted and stabilized in accordance with the invention. This plot also shows the boron and nitrogen contents of the precursor fiber as it is gradually converted to the resulting boron nitride fiber from an original boron content of 31 percent and an oxygen content of 69 percent. Line (0) represents the $B_2O_3$–$NH_3$ line wherein ammonia is added to boric oxide with theoretically no loss of $H_2O$, while line (∞) represents the $B_2O_3$-BN line, wherein the boric oxide theoretically is converted directly to boron nitride. As will become evident from the following discussion, the reactions which actually take place occur between these lines.

Line (1) represents a reaction path which would produce the theoretical composition $B_1N_1H_2O$ at its intersection (not shown) with the B/N=1/1 line, while lines (2) and (3) represent reaction paths producing at their intersections with the B/N=1/1 line, the theoretical compositions $B_2N_2H_2O$ and $B_3H_3H_2O$, respectively. The B/N=1/1 line indicates a 1/1 molecular ratio of boron to nitrogen, and the N/O=1/1 line indicates a 1/1 molecular ratio of boron to nitrogen, and the N/O=1/1 line indicates a 1/1 such molecular ratio of nitrogen to oxygen. Above the N/O=1/1 line, the N/O ratio increases, and below the B/N=1/1 line, the B/N ratio increases.

As also will become evident, there can be any number of reaction paths between line (3) and line (∞). Lines (2′), (3′) and (6°) represent the extensions above the B/N=1/1 line of the correspondingly numbered reaction paths below such line, and illustrates the change in composition of the fiber with direct replacement of the oxygen with NH groups. Line (NH) represents the composition wherein all of the oxygen present in the B/N=1/1 line is replaced with NH groups, while line (NH/2) represents 50 percent replacement of such oxygen with NH groups.

Figure 2:
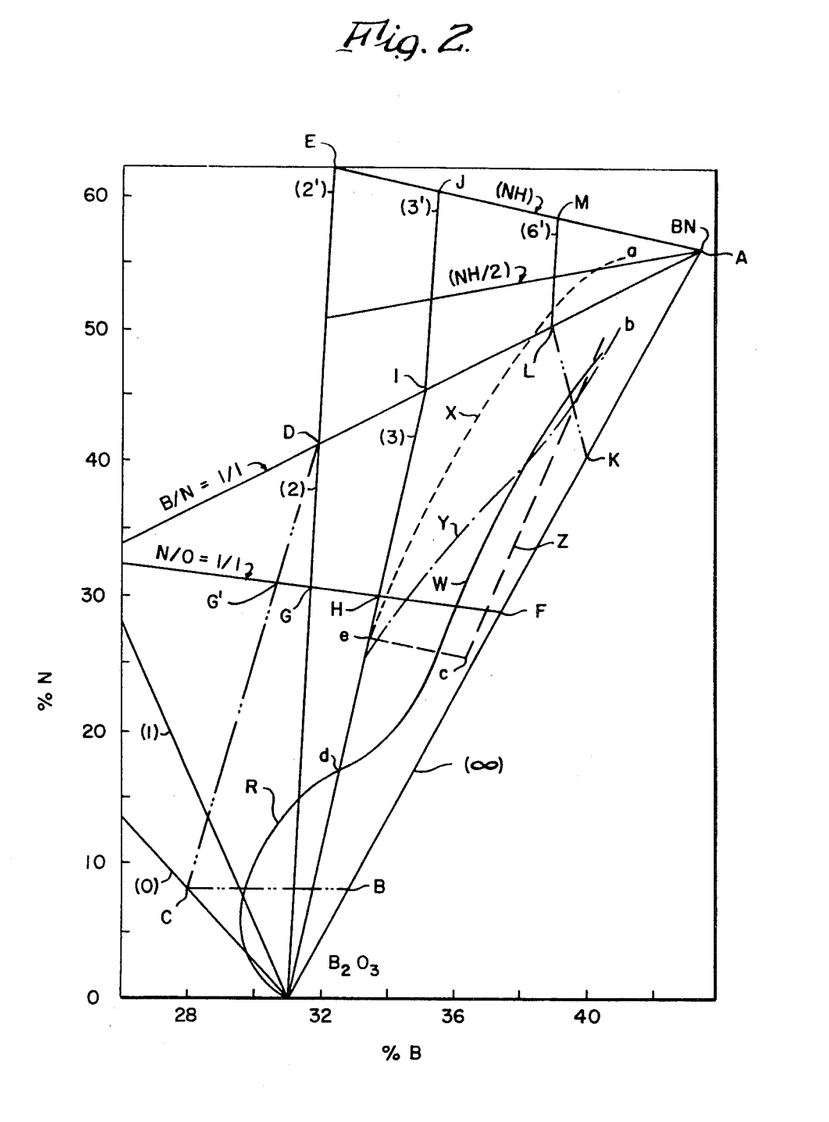
FIG. 2 is a plot of boron versus nitrogen content and indicates the various theoretical and actual reaction paths followed by the fibers as they are being converted in accordance with the present invention.

The initial effect of the nitriding path on the composition of the resulting fiber is illustrated in FIG. 2 by the line R for an 8 microns diameter $B_2O_3$ precursor fiber, at a temperature rate rise of 200° per hour. During the first stage of nitriding, the first reaction that occurs is, probably, the addition of $NH_3$ to the surface of the $B_2O_3$ fiber. Although the fiber diameter and temperature program determine the precise nitriding path during the first stage, the initial reaction does substantially follow line (O) up to about 300° C., and line (3) is reached at about 500°, regardless of diameter. For the 8 microns diameter fiber shown in FIG. 2, line (3) is reached at point $d$, representing a composition of about 32.5 percent B and 17.5 percent N. Fibers of greater diameter reach line (3) below point $d$, while fibers of lesser diameter reach line (3) at a point above point $d$. From 500° to 600° C., there is a definite tendency, regardless of diameter, for the fibers to follow line (3) toward the theoretical composition $B_3N_3H_2O$ at the intersection of this line with line B/N=1/1.

The second stage of nitriding, starting at composition $d$, for example, varies depending upon how the reaction is controlled. Four actual reaction paths, W, X, Y and Z, using an 8 microns diameter precursor fiber are shown in FIG. 2. As noted above, the composition $d$ was arrived at using a program of 200° per hour rise to 500° C., such as in run C-1 of example 6. Continuation of the program with the high initial $NH_3$ flow rate of 2 liters/min./gram to 600° C. results in a composition $e$ of about 33.5 percent B and 27 percent N. From this point, path X is followed by continuing the high $NH_3$ flow rate and the temperature program to 1000° C. and holding at this temperature, as was done in example 1, resulting in a composition $a$ of about 41 percent B and 55 percent N, with a B/N ratio of less than 1/1, after 17 hours at 1000° C.

Returning to approximately composition $e$, path Y is followed by reducing the initial $NH_3$ flow rate at about 600° C. to 1.25-2.5 percent of its original value and holding at 1000° C. This was done in example 2, run C-2 of example 6, run D-1 of example 7 and example 13, wherein the reduction was to 1.25 percent, as well as in run D-2 of example 7, wherein the reduction was to 2.5 percent. This path results in a composition approaching that of $b$, i.e. about 41 percent B and 51 percent N, with a B/N ratio greater than 1/1.

Path W is followed by reducing the initial $NH_3$ flow rate at about composition $d$ and 500°C. to 1.25-2.5 percent of its original value. This was done in run C-1 of example 6, and continuation of the program to 1000° C. likewise results in a fiber composition also approaching that of $b$.

Returning once again to about composition $e$, path Z is followed by heating the fiber from 600° to 1000° C. in $N_2$ and then continuing the nitriding at 1000° C., using a reduced $NH_3$ rate. As the fiber is heated in $N_2$ to 1000° C. it reaches composition $c$, i.e. about 36.5 percent B and 26 percent N, and ultimately reaches a composition approaching that of $b$ after further nitriding. This was the path followed in example 14.

It is noteworthy that paths W, Y and Z produce fibers which will stabilize against corrosion upon further heat treatment in an $N_2$ or other inert atmosphere, whereas fibers following path X can only be partially stabilized against corrosion by such further heat treatment. In addition, the temperature to which the partially nitrided fibers can be subjected is dependent upon their composition. Fibers of composition $d$ will not withstand 1000° C., while those of composition $e$ will withstand 1000° C., but not 1200°-1400° C. Thus, it is necessary, in order to produce resulting fibers which will be thermally stable above 1400° C., that these fibers have a B/N composition enclosed substantially within the pentagonal area shown in FIG. 2 and defined at its apices by the following approximate percentages, by weight, of boron and nitrogen, expressed as B/N and represented by the letters A, F, H, I and J, where $A$=43.6/56.4, $F$=37.5/29, $H$=33.75/30.25, $I$=35.1/45.5 and $J$=35.5/61.25.

It has also been found that compositions containing more than about 30 percent N during the first stage of nitriding will produce less corrosively stable fibers than compositions containing between about 25 and 30 percent N, during such first stage. By first stage is meant nitriding up to a maximum of about 600°-700° C. In fact, the higher the N content, the less corrosively stable the resulting fibers. For example, nitriding an 8 microns diameter $B_2O_3$ fiber at a 200° per hour rise to 550° C. and holding at this temperature results in a path (not shown) that follows course (3) from composition $d$ to 30 percent N and then diverts to the left of course (3) toward the point D representing the theoretical composition $B_2N_2H_2O$ or an approximate B/N composition of 32/41.5.

Therefore, considering the results obtained by following the various paths W, X, Y and Z in FIG. 2, the fact that the N/O=1/1 line crosses line (3) at about 30 percent N, and the approximately parallel relationship between N/O=1/1 line and the portion of the path Z from $e$ to $c$, below such N/O line, it is quite apparent that the N/O ratio should not exceed 1/1 during the first stage of nitriding, if it is desired to produce resulting fibers which readily can be corrosively stabilized to any substantial degree. In fact, to produce resulting fibers which can be so corrosively stabilized, they should fall within the quadrangular area A, F, H, I, and preferably within the triangular area A, K, L, where $K$=40/40 and $L$=38.9/50.25. For example, considering the paths W, Y and Z, the fibers had a composition approaching that of $b$ (B/N=41/51), after completion of the first and second nitriding stages making up the reaction and reaction control steps of the conversion procedure. When the resulting fibers were subjected to a corrosion resistance test by immersion in boiling $H_2O$ for 3 hours, the fiber following path W lost about 25 percent in weight, the path Y fiber lost 59.1 percent in weight, and the path Z fiber lost 10.7 percent in weight. On the other hand, after heating in $N_2$ at a stabilizing temperature of 1800° C. for 1 hour, these fibers had the following weight losses after the same test: path W fiber—<1 percent, and 1.4 percent after 24 hours; path Y fiber—0.2 percent, and path Z fiber 0.1 percent. Thus, each resulting fiber had excellent corrosion resistance suitable for even the most stringent of electrical applications.

By way of contrast, the path X fiber, when subjected to the aforesaid boiling water test, had a 90 percent weight loss before such thermal treatment and an 18.1 percent weight loss thereafter. Accordingly, a fiber following this path could not readily be completely corrosively stabilized, and would be suitable for use only when not subjected to corrosive conditions, such as in an essentially moisture-free environment. At the same time, there are many situations in which such unstable fibers could be used, such as reinforcement in plastic laminates for ablative or other purposes. This is also true of the various resulting fibers within the larger pentagonal area A, B, C, D, E, where $B=33/8.5$, $C=28/8.5$, $D=32/41.5$ and $E=32.5/63$, but falling outside the more readily stabilizable, quadrangular area A, F, H, I. While those resulting fibers which may fall within the largest triangular area A, D, E, are corrosively unstable, they do become more corrosively stable as they fall within the smaller triangular areas A, I, J, where $J=35.5/61.25$ and A, L, M, where $L=38.9/50.25$ and $M=39.2/59$, and thereby approach the pure BN compound at apex A. Furthermore, those fibers within the triangle A, L, M do contain, and preferably consist essentially of a boron nitride composition which has a substantially greater thermal stability and corrosive resistance than the original $B_2O_3$ precursor fiber, which will disintegrate in moisture and begin to soften at about 300° C. Moreover, where a pure $B_2O_3$ fiber is converted to a BN composition fiber within triangle A, L, M, the boron and nitrogen content totals at least about 89 percent by weight of the fiber.

Likewise, for those partially nitrided fibers falling within the quadrangular area I, H, G', D, where $G'=30.5/31.0$, while it is unlikely that they could be completely stabilized against corrosion, because they lie to the left of line (3) above the N/O=1/1 line, they still represent a substantial conversion of the $B_2O_3$ precursor fiber to a resulting fiber having improved corrosion resistance and thermal stability over the precursor fiber.

As for the partially nitrided fibers falling within the quadrangular area F, B, C, G', it is rather obvious that these fibers can be corrosively stabilized by proper first and second stage nitriding treatment, particularly those boron and nitrogen containing compositions falling along and to the right of path (3). While the increase in corrosive resistance and thermal stability over that of a pure $B_2O_3$ fiber is correspondingly lower than in those fibers having a boron and nitrogen containing composition above the N/O=1/1 line, there is still a substantial conversion of such precursor fiber to a resulting fiber consisting essentially of a boron and nitrogen containing composition having a total boron and nitrogen content constituting at least about 36.5 percent by weight of the fiber. At composition $d$, the total boron and nitrogen content would be at least about 50 percent by weight of such fiber.

These last-mentioned resulting fibers, even though only nitrided through the first stage, say to 400°–600° C., are considered to have a sufficient boron and nitrogen content so as to be useful in carrying out further reactions with other ingredients and compositions which may be introduced at this stage of the inventive process, such as a carbonaceous atmosphere for converting the intermediate boron and nitrogen containing composition to a boron carbide composition for example. The feasibility of this further conversion has already been demonstrated with completely nitrided resulting fibers within the quadrangular area A, K, L, M, by heating the BN fibers at about 2100° C. in the presence of a carbon source.

Considering the crystalline characteristics of the resulting fibers, such as those following paths W, X, Y and Z of FIG. 2, electron diffraction analysis and X-ray analysis have shown the presence of a polycrystalline boron nitride structure. Measurements of the La and Lc crystal dimensions, which represent the width and thickness of the crystals, respectively, revealed a La range from about 40 to about 223 A (Angstroms), a Lc range from about 11 to about 84 A, and a $d_{002}$ approaching 3.33 A, where $d_{002}$ represents the interlayer spacing. Growth of crystals to substantially larger dimensions is not desirable because prolonged heating at elevated temperatures during conversion is required. With proper reaction conditions, it is possible to develop the desired crystalline size at temperatures as low as 1000° C. This was the case for a fiber following path Z in example 14, wherein the crystal dimensions were Lc=20 A and La=62 A following nitriding, and the weight loss was only 10.7 percent after 3 hours in boiling water. After stabilizing treatment, the crystals grew to Lc=69 A and La=110 A, and the weight loss reduced to 0.1 percent after 3 hours in boiling water. In each instance, the crystalline size was well within the overall range specified.

As for the density of the resulting fibers produced in accordance with the present invention, this value has been found to range between about 1.4–2.0 grams/cc., and the corrosion resistance has been found to vary inversely with the density, as demonstrated below in table VI.

TABLE VI

| | Stabilized density | Stabilization temp., °C. | Boiling water test | |
|---|---|---|---|---|
| | | | Hours | Percent loss |
| Example: | | | | |
| 11 | 1.479 | 1,800 | 3 | 26.6 |
| | 1.469 | 2,200 | 75 | 37.2 |
| 15 | 1.976 | 1,800 | 20 | 1.6 |
| | 1.963 | 2,200 | 75 | 0.1 |

The proximate cause of the lower density and corrosive instability of the resulting fiber of example 11 was the relatively high concentration of $NH_3$ used during the second stage of nitriding, because the initial flow rate was only reduced by 75 percent, whereas in example 15 this rate was reduced by 97.91 percent.

Thus, use of low concentrations of $NH_3$ during the second stage nitriding from about 400° or 500°–1000° C. has consistently produced fibers with higher densities, as was done in examples 4, 15 and 16. The higher density is probably associated with the existence during nitriding of a more fluid structure which can readily flow into the micropores formed during the evolution of water. Densities as low as 1.42 have been produced when excess ammonia is allowed to contact the fibers in the temperature range of 500°–1000° C. Under these conditions, a high degree of microporosity is frozen into the structure as confirmed by surface measurements of up to 250 m.$^2$/g., and such fibers do not stabilize readily even when heated up to 2200° C., as is evident from example 1. Fibers with densities as low as 1.4 grams/cc. should provide considerable advantages in ablative applications because of the decreased weight.

As mentioned earlier, the present invention is not restricted to the conversion of $B_2O_3$ fibers to BN fibers, and also contemplates reacting a precursor fiber consisting essentially of boric oxide and silica with ammonia to produce a resulting fiber consisting essentially of boron nitride and silica. To achieve this, the boric oxide-silica precursor fiber, having a maximum diameter of about 30 microns and preferably of about 10 microns, is heated in ammonia at a temperature rise ranging from about 25° C. to about 500° C. per hour up to a final temperature between about 300° C. and about 1500° C. while simultaneously subjecting the fiber to a current of ammonia having a flow rate ranging between about 0.025 liter and about 6 liters/min./gram of fiber, and continuing heating at the final temperature until the boric oxide content of the precursor fiber is converted to boron nitride. The silica content of the precursor fiber acts as an inert material and is not nitrided. Accordingly, the disclosure herein relating to the conversion of boric oxide fibers to boron nitride fibers is applicable to the conversion of boric oxide-silica fibers to boron nitride-silica fibers, the nitriding of the boric oxide proceeding in the same manner in either case. It is possible, in accordance with the invention, to produce resulting fibers consisting essentially of boron nitride and silica wherein the boron nitride is present to the extent of from about 1 percent to about 99 percent, by weight, and the silica is present, conversely, to the extent of from about 99 percent to about 1 percent, by weight. Moreover, while the invention is principally concerned with nitriding precursor fibers consisting solely of boric oxide and silica, it also contemplates nitriding precursor fibers consisting essentially of boric oxide and silica but which also contain one or more well-known glass constituents such as sodium oxide, potassium oxide, calcium oxide, aluminum oxide and magnesium oxide. Such constituents do not adversely affect the conversion of the boric oxide to boron nitride. Fibers consisting essentially of boron nitride and silica and containing one or more of these constituents may thus be produced.

Resulting fibers consisting essentially of boron nitride and silica may be used for the same purposes as resulting fibers produced by nitriding pure boric oxide precursor fibers. The following examples are illustrative.

EXAMPLE 22

An intimate mixture of 180 grams of boric oxide and 20 grams of silica was heated at 950° C. for 14 hours to produce a clear, bubble-free melt. The melt was poured into a nickel crucible having an orifice and fibers 6 microns in diameter were spun from the melt at 690° C.

1.0 gram of the fibers thus formed were placed in a 1 in. diameter tube furnace. Ammonia was passed through the furnace at the rate of 2 liters/min. (2 liters/min./gram of fiber) and the temperature was raised at the rate of 200° C. per hour from room temperature to 1400° C., where it was held for 3 hours.

Analysis of the resulting fibers indicated that they consisted essentially, by weight, of 92.5 percent boron nitride and 7.5 percent silica. The fibers had a tensile strength of about 38,000 p.s.i.

EXAMPLE 23

An intimate mixture of 100 grams of boric oxide and 100 grams of silica was heated at 1200° C. for 48 hours to produce a clear, bubble-free melt. The melt was poured into a platinum crucible having an orifice and fibers 5 microns in diameter were spun from the melt at about 900° C.

1.0 gram of the fibers thus formed were placed in a 1 in. diameter tube furnace. Ammonia was passed through the furnace at the rate of 2 liters/min. (2 liters/min./gram of fiber) and the temperature was raised at the rate of 200° C. per hour from room temperature to 1400° C., where it was held for 3 hours.

Analysis of the resulting fibers indicated that they consisted essentially, by weight, of 39 percent boron nitride and 61 percent silica. The fibers had a tensile strength of about 45,000 p.s.i.

EXAMPLE 24

The end of a glass rod consisting of 96 percent silica and 4 percent boric oxide by weight was heated in a flame until the glass flowed and fibers of about 5-6 microns diameter were attenuated from the molten tip.

1.0 gram of the fibers thus formed were placed in a 1 in. diameter tube furnace. Ammonia was passed through the furnace at the rate of 2 liters/min. (2 liters/min./gram of fiber) and the temperature was raised at the rate of 200° C. per hour from room temperature to 1400° C., where it was held for 3 hours.

Analysis of the resulting fibers indicated that they consisted essentially, by weight, of 2.7 percent boron nitride and 97.3 percent silica. The fibers had a tensile strength of about 32,000 p.s.i.

SUMMARY

From a fibrous standpoint, the invention includes the following parameters. The precursor fibers must have a maximum diameter of not more than about 20-30 microns, with about 10 microns being the preferred maximum, and incorporate the boron and oxygen containing composition substantially throughout their thickness, in order to permit substantially complete penetration of the nitrogen and hydrogen containing composition and ultimately substantially complete conversion to the resulting fiber incorporation substantially throughout its thickness the boron and nitrogen containing composition. Preferably, the precursor fiber consists essentially of $B_2O_3$ and the resulting fiber consists essentially of a boron nitride composition, with a minimum total boron and nitrogen content of about 80 percent (apex K, FIG. 2) by weight of the fiber, and a B/N ratio of 1/1 or greater (triangle AKL, FIG. 2). At the same time, the minimum boron and nitrogen content of the boron and nitrogen containing composition of a partially converted fiber can be as low as 36.5 percent (apex C, FIG. 2), but it is preferred that this content total at least about 61.5 percent by weight of such composition (apex G', FIG. 2) and that the N/O ratio be 1/1 or greater.

The tensile strength of the resulting fibers may range from about 10,000 to over 100,000 p.s.i., while their density may range between about 1.2 and 2.3 grams/cc., but preferably their tensile strength ranges from about 30,000 to over 100,000 p.s.i. and their density usually ranges between about 1.4 and 2 grams/cc., and most preferably over 1.8 grams/cc. for fibers of about 10 microns or less diameter, which are preferably free of internal and external defects. While the corrosive stability of the resulting fibers may vary over a wide range, it is preferred that the stabilized fibers retain about 85 percent of their weight after 3 hours immersion in boiling water for thermal insulation purposes, and that they retain about 98 percent of their weight after such test for electrical applications, such as electrical insulation. In each instance, the resulting fibers will have a greater thermal stability than the precursor fibers, but it is preferred that such resulting fibers retain their fibrous form indefinitely at a temperature of at least about 700° C. in an oxidizing atmosphere and at a temperature of at least about 1400° C. in an inert atmosphere.

As to the form of the inventive resulting fibers, they may be continuous or staple in nature, and can appear as continuous filament or blown wood, as well as chopped strand and continuous filament strand. The continuous filament form has the most immediate commercial potentialities. The nitriding of the wood in tube furnaces, as in examples 1-15, is extremely efficient, since the spread or fluffed out fibers in the bed provide an efficient distribution of the ammonia. Hence, the problems of fiber fusion and occurrence of defects during conversion are minimized when processing such continuous filament wool form. At the same time, staple fibers have been successfully processed in accordance with the invention, as is evident from example 16, wherein care was taken to ensure proper distribution of the chopped strands for adequate $NH_3$ contact.

From a process standpoint the invention includes the following parameters. The starting or initial nitriding temperature of the precursor fibers should not be more than about 250-350° C. in order to assure formation of the desired nitrogen and hydrogen containing shield and porous structure for the desired conversion reaction which begins about 300° C. Hence, the final temperature to which the fiber are heated during the nitriding or conversion phase can range between above 300° and up to about 1500° C., depending upon the degree of conversion desired.

While the flow rate of the nitrogen and hydrogen containing composition may range between about 0.025 and 6 liters/min./gram of fiber, the initial flow rate, i.e. up to above 400°-500° C., should be relatively high to ensure adequate contact with the precursor fibers for the formation of the nitrogen and hydrogen containing shield to prevent fiber fusion, and this initial flow rate preferably ranges between about 1 and 2 liters/min./gram, provided there is a high contact efficiency, i.e. a uniform distribution of the fibers over the cross section of the furnace. This initial flow rate may, of course, be continued throughout the reaction at a temperature rise ranging between about 25° and 5000° per hour, the larger the diameter of the fiber, the lower the temperature rise. However, for control purposes, such as to produce resulting fibers which can be sufficiently stabilized against corrosion for thermal insulation purposes, such flow rate should be reduced by at least about 25 percent at a temperature ranging between about 400° and 1000° C. For electrical applications, such reduction should be by at least 60 percent and preferably by at least 75 percent up to about 99 percent at a temperature ranging between about 500° and 700° C.

Alternately, any suitable oxygen containing composition, and preferably $O_2$, may be added to the gaseous nitrogen and hydrogen containing composition, as was done in example 18, in order to control the reaction. These fibers, after stabilizing heat treatment in an inert atmosphere, retained about 85 percent of their weight after 3 hours in boiling water, and hence are suitable for thermal insulating purposes.

Another alternative, and actually the most preferable reaction control procedure, is to densify the fibers by rapidly heating the same above about 500°-600° C. to a final temperature of about 900°-1500°, at a reduced flow rate. This was done in examples 12 and 14, producing resulting fibers which were readily stabilized to a weight retention of over 98 percent after 3 hours in boiling water.

The stabilizing treatment for increasing the corrosion resistance of the converted resulting fibers may take three basic forms. The first, and most preferred, is heating such fibers in an inert atmosphere at a stabilizing temperature between about 1400 and 2500° C. for as much as 2 hours to as little as 5 minutes, the higher the temperature, the shorter the time. This was done in example 14, and produced fibers highly stabilized against corrosion resistance.

One alternate procedure is to heat in preferably $O_2$ at a temperature below the above stabilizing temperature and within the above stabilizing time range, prior to the above preferred stabilizing treatment. This was done in example 17, and produced highly stabilized fibers.

Another stabilizing heat treatment is to heat the converted resulting fibers in preferably a $NH_3$ and $O_2$ atmosphere within the preferred stabilizing temperature range, but for a longer time, as was done in example 19. The resulting fibers were highly stabilized and suitable for electrical applications.

Considering the various applications for the resulting fibers produced in accordance with the present invention, these include the following:

Reinforcement of plastics, ceramics, metals and other structural materials is quite feasible for all the resulting fibers of the invention regardless of whether or not they are completely converted to a boron nitride composition, and whether or not they are highly corrosively stabilized. Specific applications include reinforcement of ablation materials, grinding wheels and boron nitride bodies.

Likewise, for those resulting fibers which have been converted to a boron nitride composition having a corrosive stability represented by about 85 percent weight retention after 3 hours in boiling water, these are readily usable in various thermal insulating applications. Specific applications include fabrication into mats, blankets, blocks and boards for thermally insulating furnaces and other structures.

For those preferred resulting fibers consisting essentially of a boron nitride composition and having a corrosive stability represented by a weight retention of at least about 98 percent after 3 hours in boiling water, these are suitable for all sorts of stringent electrical and electronic applications in a wide variety of forms. In continuous and staple wool form, these fibers may be used for general electrical insulating purposes and for high temperature filtration of corrosive liquids and gases. In paper and nonwoven web form, these fibers may be used for electrical insulation, filter papers, laminates; they may be blended with other fibers for producing protective clothing as well as to replace other refractory fibers such as asbestos in such clothing. In mat, blanket, block and board form, these fibers may be used to thermally and electrically insulate various structures such as tanks, towers, lehrs, ovens, boilers, melting tanks, annealing pits, and high temperature furnaces, especially those structures employing or located in corrosive atmospheres.

In continuous filament form, these preferred resulting fibers can be used as electrical insulation for motor windings, where a high degree of electrical resistance and a high thermal conductivity is required. In such continuous filament form, these preferred fibers, within minimum tensiles of 20,000-30,000 p.s.i. can be woven to form various textiles with or without other fibers. These textiles would be more lubricous because of the presence of the preferred BN fibers and would be expected to have increased wear resistance. These continuous filaments could also be wound onto various shapes either before or after nitriding to yield a body having a fibrous boron and nitrogen containing coating, for increased thermal and corrosive stability.

It will now be seen how the present invention has accomplished its various objectives, and additional advantages of the invention likewise will be evident. While the present invention has been described and illustrated herein by reference to certain preferred embodiments of the process and fibrous products thereof, it is to be understood that various changes and modifications may be made by those skilled in the art without departing from the inventive concepts, the scope of which is to be determined by the appended claims.

We claim:

1. An inorganic fiber having a maximum diameter of about 30 microns consisting essentially of from about 1 percent to about 99 percent by weight boron nitride and from about 99 percent to about 1 percent by weight silica.

2. An inorganic fiber as set forth in claim 1 having a maximum diameter of about 10 microns.

3. A process for the production of an inorganic fiber consisting essentially of from about 1 percent to about 99 percent by weight boron nitride and from about 99 percent to about 1 percent by weight silica which comprises heating a precursor fiber having a maximum diameter of about 30 microns and consisting essentially of boric oxide and silica at a temperature rise between 25° C. per hour and 5000° C. per hour up to a final temperature between 300° C. and 1500° C. in a current of ammonia having a flow rate between 0.025 liter and 6 liters/min./gram of fiber and continuing heating at said final temperature until said boric oxide is converted to boron nitride.

4. A process as set forth in claim 3 wherein said precursor fiber has a maximum diameter of about 10 microns.